(12) United States Patent
Mott et al.

(10) Patent No.: US 10,329,964 B2
(45) Date of Patent: Jun. 25, 2019

(54) LATCHING SOLENOID FOR ENGINE MANAGEMENT

(71) Applicant: BorgWarner Inc., Auburn Hills, MI (US)

(72) Inventors: Philip J. Mott, Dryden, NY (US); Christopher P. Thomas, Commerce, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/309,467

(22) PCT Filed: May 1, 2015

(86) PCT No.: PCT/US2015/028770
§ 371 (c)(1),
(2) Date: Nov. 8, 2016

(87) PCT Pub. No.: WO2015/175239
PCT Pub. Date: Nov. 19, 2015

(65) Prior Publication Data
US 2017/0191385 A1    Jul. 6, 2017

Related U.S. Application Data

(60) Provisional application No. 61/993,484, filed on May 15, 2014.

(51) Int. Cl.
*F01L 1/34* (2006.01)
*F01L 1/26* (2006.01)
(Continued)

(52) U.S. Cl.
CPC ............... *F01L 1/267* (2013.01); *F01L 1/146* (2013.01); *F01L 1/20* (2013.01); *F01L 13/0005* (2013.01);
(Continued)

(58) Field of Classification Search
CPC ... F01L 1/267; F01L 1/146; F01L 1/20; F01L 2820/031; F01L 13/0005; F01L 2013/001;
(Continued)

(56) References Cited

U.S. PATENT DOCUMENTS 5,613,469 A    3/1997  Rygiel
5,924,396 A    7/1999  Ochiai et al.
(Continued)

FOREIGN PATENT DOCUMENTS

CN    1086043 A    4/1994
CN    101787912 A    7/2010
(Continued)

OTHER PUBLICATIONS

International Search Report and Written Opinion; dated Jul. 30, 2015; for International Application No. PCT/US2015/028770; 14 pages.
(Continued)

*Primary Examiner* — Zelalem Eshete
(74) *Attorney, Agent, or Firm* — BrooksGroup

(57) ABSTRACT

A number of variations may include a product comprising a latching solenoid comprising: a valve; a spring operatively connected to the valve; a base plate adjacent the valve, wherein the base plate is constructed and arranged to maintain residual magnetism; an armature adjacent the base 10 plate and operatively connected to the spring; a pin disposed within the armature and operatively connected to the valve; wherein the latching solenoid includes a coil, wherein when the latching solenoid is energized the coil pulls the armature in a first direction toward the base plate; and wherein when the latching solenoid is energized the base plate becomes residually 15 magnetized so that when the armature moves in the first direction toward the base plate the armature
(Continued)

magnetically latches to the base plate and remains attached to the base plate when the latching solenoid is de-energized.

19 Claims, 4 Drawing Sheets

(51) Int. Cl.
    *F01L 1/14*     (2006.01)
    *F01L 1/20*     (2006.01)
    *F01L 13/00*     (2006.01)
    *F16K 31/08*     (2006.01)
    *F01L 1/24*     (2006.01)

(52) U.S. Cl.
    CPC ..... *F16K 31/082* (2013.01); *F01L 2001/2427* (2013.01); *F01L 2013/001* (2013.01); *F01L 2105/00* (2013.01); *F01L 2820/031* (2013.01)

(58) Field of Classification Search
    CPC .......... F01L 2105/00; F01L 2001/2427; F16K 31/082
    See application file for complete search history.

(56) References Cited

U.S. PATENT DOCUMENTS

| | | |
|---|---|---|
| 6,489,870 B1 | 12/2002 | Ward et al. |
| 2004/0123824 A1 | 7/2004 | Afjeh et al. |
| 2004/0244744 A1 | 12/2004 | Falkowski et al. |
| 2005/0045132 A1 | 3/2005 | Hendriksma et al. |
| 2013/0075639 A1 | 3/2013 | Beneker et al. |

FOREIGN PATENT DOCUMENTS

| | | |
|---|---|---|
| CN | 103680808 A | 3/2014 |
| DE | 102013224921 A1 | 6/2014 |

OTHER PUBLICATIONS

Chinese Office Action dated Jul. 9, 2018 ; Application No. 201580023543.8; Applicant: BorgWarner Inc.; 20 pages.
Chinese Office Action dated Feb. 2, 2019 ; Application No. 201580023543.8; Applicant: BorgWarner Inc.; 11 pages.

LATCHING SOLENOID FOR ENGINE MANAGEMENT

CROSS-REFERENCE TO RELATED APPLICATIONS

This application claims the benefit of U.S. Provisional Application 61/993,484 filed May 15, 2014.

TECHNICAL FIELD

The field to which the disclosure generally relates to includes solenoids.

BACKGROUND

An engine may include one or more solenoids.

SUMMARY OF ILLUSTRATIVE VARIATIONS

One variation may include a product comprising a latching solenoid comprising a valve; a spring operatively connected to the valve; a base plate adjacent the valve, wherein the base plate is constructed and arranged to maintain residual magnetism; an armature adjacent the base plate and operatively connected to the spring; a pin disposed within the armature and operatively connected to the valve; wherein the latching solenoid includes a coil, wherein when the latching solenoid is energized the coil pulls the armature in a first direction toward the base plate; and wherein when the latching solenoid is energized the base plate becomes residually magnetized so that when the armature moves in the first direction toward the base plate the armature magnetically latches to the base plate and remains attached to the base plate when the latching solenoid is de-energized.

Another variation may include a method comprising engine management during cylinder deactivation using latching solenoids comprising: operatively connecting at least one latching solenoid to at least one cylinder in an engine; energizing the at least one latching solenoid to activate the at least one cylinder; de-energizing the at least one latching solenoid and using residual magnetism to keep the at least one cylinder activated; and eliminating the residual magnetism to deactivate the at least one cylinder.

Another variation may include a method comprising managing a stepped cam using latching solenoids comprising: operatively connecting at least one latching solenoid to at least one cylinder in an engine; energizing the at least one latching solenoid to activate a second cam profile; de-energizing the at least one latching solenoid and using residual magnetism to keep the second cam profile activated; and eliminating the residual magnetism to activate a first cam profile.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
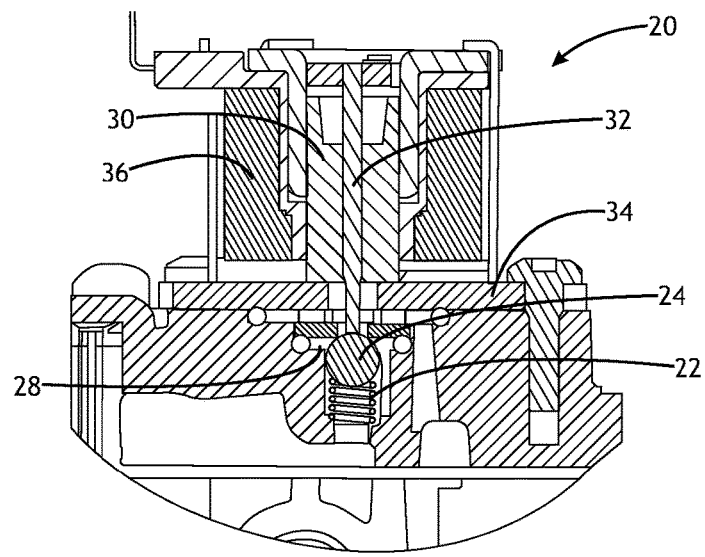
FIG. 1 illustrates a section view of a latching solenoid according to a number of variations.

Referring to FIG. 1, in a number of variations, a latching solenoid 20 may comprise a spring 22, a valve 24, an armature 30, a pin 32, and a base plate 34. The solenoid 20 may include a coil 36 which may be energized to pull the armature 30 in a first direction. Any number of valves 24 may be used including, but not limited to, a ball or disc valve. In a number of variations, the base plate 34 may comprise a hard magnetic material which retains residual magnetism. The armature 30 may be operatively connected to the spring 22. The latching solenoid 20 may be constructed and arranged to use the residual magnetism so that the position of the armature 30 may be maintained even after the coil 36 is de-energized.

When the coil 36 is energized the armature 30 moves toward the base plate 34 which causes the pin 32 to move downward which may cause the ball or disc 26 to move out of the valve seat 28 to open the valve 24. When the latching solenoid 20 is energized, the base plate 34 becomes magnetized which may cause the armature 30 to stick or be secured to the base plate 34. This may allow the latching solenoid 20 to maintain its position causing the valve 24 to remain open without using a constant energy supply. The latching solenoid 20 may then be released from its position by "cancelling" or "eliminating" the residual magnetic field by sending a "reverse" current (commonly referred to as degaussing) to the base plate 34. The spring 22 may force the armature 30 back upward which may allow the force of the spring 22 to allow the ball or disc to engage with the ball seat 28. In a number of variations, an intervening force including, but not limited to, a spring 22, may be required to prevent the armature 30 from reengaging the base plate 34, as will be discussed hereafter.

Figure 2:
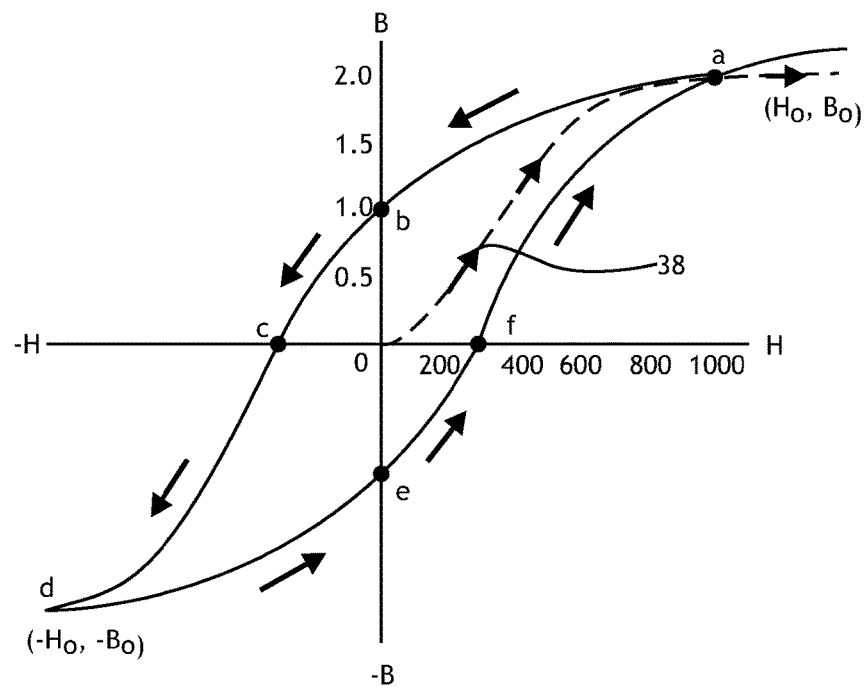
FIG. 2 illustrates a B-H curve according to a number of variations.
Figure 3:
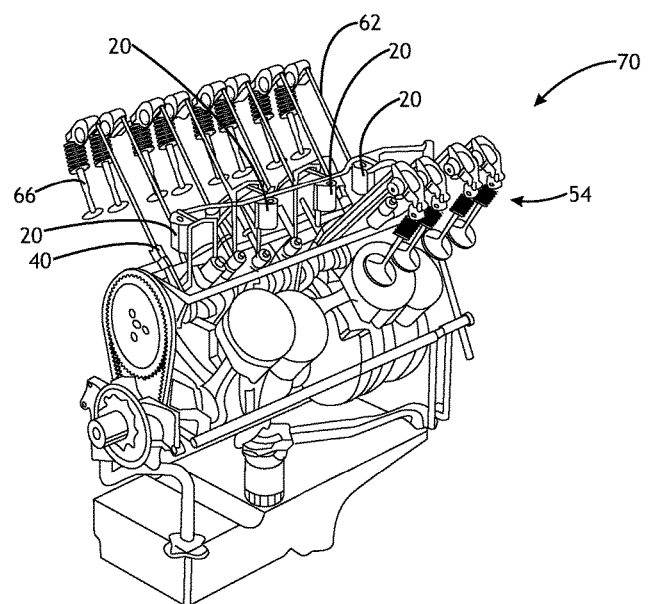
FIG. 3 illustrates a perspective view of an engine according to a number of variations.

FIG. 2 illustrates a variation of a B-H Curve (Hysteresis Loop) courtesy of http://www.electronics-tutorials.ws/electromagnetism/magnetic-hysteresis.html. In a number of variations, a current 38 may be applied to the base plate 34 to generate a magnetic field. At point (a) the magnetic flux density [B] will saturate the base plate 34. When supply of current to the coil 36 is eliminated, the field strength reduces to point "B" due to the hysteresis in the hard magnetic material base plate 34. This residual magnetism, a property of the material used and the construction, may be sufficient to hold the armature 30 in contact with the base plate 34. A zero flux density may be achieved by reversing the current for a short amount of time, a variation of which is illustrated at (c). If, however, the reverse current is maintained for too long, an equal but opposite flux density may be generated in the base plate 34, a variation of which is illustrated at (d). Therefore, when the latching solenoid base plate 34 is degaussed, an intervening force may be required so that the armature 30 separates from the base plate 34. Any number of elements may be used as an intervening force including, but not limited to, a spring 22, which may move the armature 30 away from contact with the base plate 34 so that the armature 30 may not remain latched to the base plate 34, a variation of which is illustrated in FIG. 1.

In a number of variations, one or more latching solenoids 20 may be used in low duty cycle applications which may have extended intervals between state changes including, but not limited to, engine management applications. An engine management application may include, but is not limited to, cylinder deactivation or stepped cams for valve trains. The one or more latching solenoids 20 may improve energy efficiency by eliminating the need to supply a constant energy supply to maintain various positions of the latching solenoid 20. The latching solenoids 20 may also be constructed and arranged to handle higher current levels which may provide faster actuation times as a result of the zero or lower continuous power usage as the coils only have to handle the inrush current during the time the latching solenoid 20 changes states.

Figure 4:
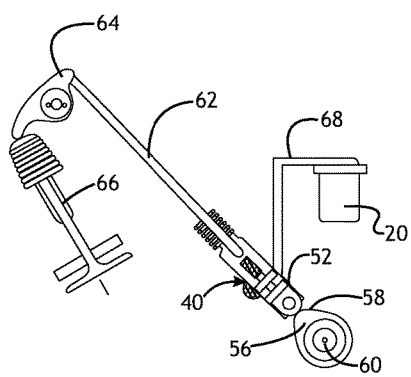
FIG. 4 illustrates a side view of a solenoid attached to an engine component according to a number of variations.
Figure 5:
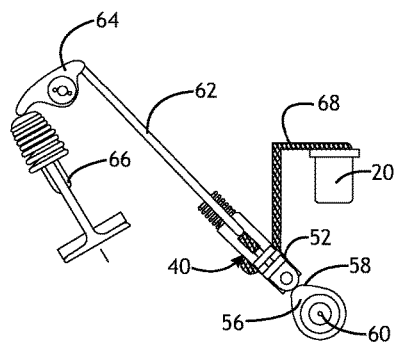
FIG. 5 illustrates a side view of a solenoid attached to an engine component according to a number of variations.
Figure 6:
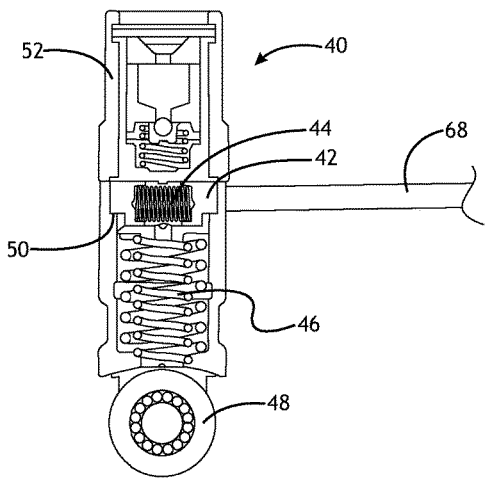
FIG. 6 illustrates a section view of a lifter mechanism according to a number of variations.
Figure 7:
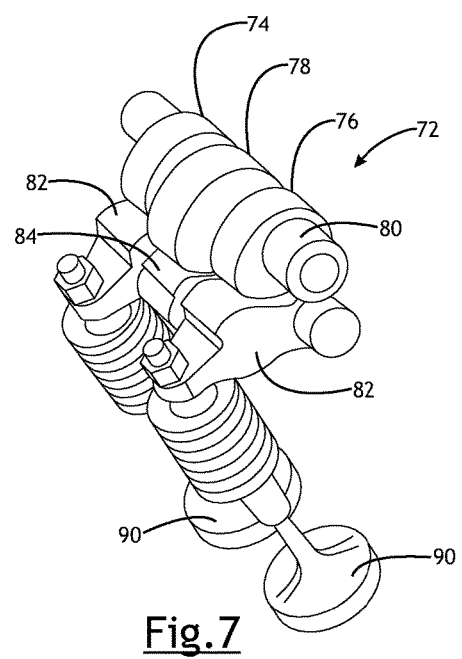
FIG. 7 illustrates a perspective view of a stepped cam according to a number of variations.

Referring to FIGS. 3-6, in a number of variations, an engine 70 using cylinder deactivation may include a lifter mechanism 40 which may be operatively connected to a cylinder to control whether the cylinder is activated or deactivated. A lifter mechanism 40 may include a mechanical latch 42, a first spring 44 disposed within the mechanical latch 42, and a second spring 46 operatively connected to a lifter 48, a variation of which is illustrated in FIG. 6. The lifter 48 may be operatively connected to a cam 56 which may be attached to a camshaft 60, variations of which are illustrated in FIGS. 4 and 5. A lobe 58 on the cam 56 may engage the lifter 48 as the camshaft 60 rotates which may cause the second spring 46 to push upward in the lifter mechanism 40. A push rod 62 may be slideably connected to the lifter mechanism 40, and may also be connected to a rocker arm 64. The rocker arm 64 may control the overhead valves 66 of the cylinder. The mechanical latch 42 may be opened or closed. If the mechanical latch 42 is opened, the force of the first spring 44 may cause the mechanical latch 42 to be seated in a groove 50 in the housing 52 of the lifter mechanism 40, a variation of which is illustrated in FIG. 6. This may prevent movement of the mechanical latch 42 by the lifter 48 and the second spring 46 when the cam lobe 58 contacts the lifter 48 which may deactivate the cylinder from functioning. If the mechanical latch 42 is closed, the mechanical latch 42 may be disengaged from the groove 50 in the lifter mechanism housing 52 and may be moveable in the lifter mechanism housing 52. Therefore, as the camshaft 60 rotates the cam lobe 58 may contact the lifter 48 which may cause the lifter 48 to push upward against the second spring 46 and the mechanical latch 42 which may cause the push rod 62 to move upward and rotate the rocker arm 64 to open and close the cylinder overhead valves 66 so that the cylinder may be activated and function properly.

In a number of variations, one or more latching solenoids 20 may be used to manage cylinder deactivation. In a number of variations, one or more latching solenoids 20 may be attached to one or more lifter mechanisms 40 through one or more pipes 68, variations of which are illustrated in FIGS. 4 and 5.

In a number of variations, the one or more latching solenoids 20 may be energized so that the valve 24 may be open which may allow oil into the pipe 68 and into the lifter mechanism 40. The pressure from the oil may then cause the mechanical latch 42 to compress the first spring 44 so that the mechanical latch 42 closes and disengages from the groove 50 which may allow the mechanical latch 42 to move within the lifter mechanism housing 52. As the camshaft 60 rotates the cam lobe 58 may contact the lifter 48 which may cause the lifter 48 and second spring 46 to push upward on the mechanical latch 42 causing the push rod 62 to move upward to rotate the rocker arm 64 which may open and close the cylinder overhead valves 66 and allow the cylinder to function properly. The one or more latching solenoids 20 may then be de-energized, however, due to the residual magnetism of the at least one latching solenoid 20, the valve 24 may remain open to allow oil to continue to flow into the pipe 68 and into the lifter mechanism 40 which may allow the cylinder to continue to be activated without the need for a constant current supply.

In a number of variations, the one or more cylinders may be deactivated by eliminating the residual magnetism in the at least one latching solenoid 20 so that the valve 24 may close which may prevent oil from entering into the lifter mechanism 40. The mechanical latch 42 may then be held open through the force of the first spring 44 into the groove 50 in the housing 52 of the lifter mechanism 40 which may prevent movement of the mechanical latch 42. This may prevent the lifter 48 from activating the push rod 62 which may deactivate the cylinder.

The use of the one or more latching solenoids 20 for cylinder deactivation may improve energy efficiency where numerous solenoids are required as the latching solenoids 20 may only require inrush current during the time the latching solenoid 20 changes states rather than requiring a continuous current to hold the solenoid in the various states.

Figure 8:
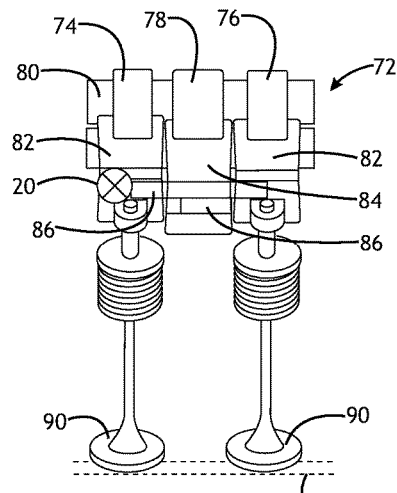
FIG. 8 illustrates a front view of a stepped cam according to a number of variations.
Figure 9:
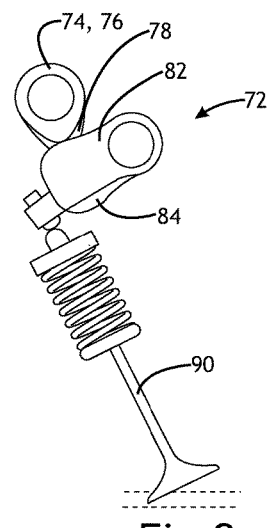
FIG. 9 illustrates a side view of a stepped cam according to a number of variations.
Figure 10:
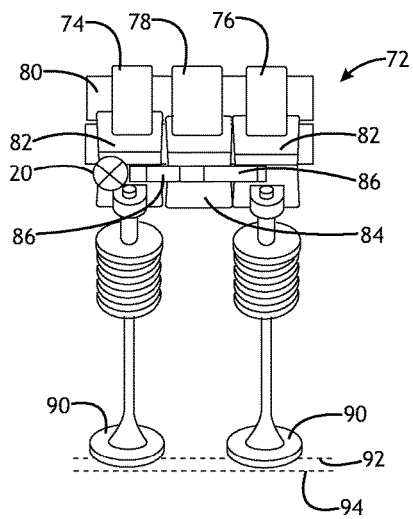
FIG. 10 illustrates a front view of a stepped cam according to a number of variations.
Figure 11:
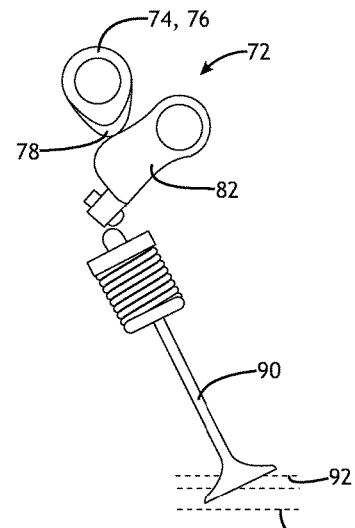
FIG. 11 illustrates a side view of a stepped cam according to a number of variations.

Referring to FIGS. 7-11, in a number of variations, a latching solenoid 20 may be used to manage stepped cams 72. A stepped cam 72 may allow the use of two different cam lobe profiles during engine operation. In a number of variations, a stepped cam 72 may include a first and second rocker arm 82, 84, a first and second cam lobe 74, 76 having the same cam profile and a third cam lobe 78 having a second cam profile. In a number of variations, at least one first, second, and third cam lobe 74, 76, 78 may be operatively connected to at least one cylinder in an engine. The cam lobes 74, 76, 78 may each be attached to a camshaft 80. One or more synchronizing pins 86 may be operatively connected to the first and second rocker arms 82, 84, variations of which are illustrated in FIGS. 8 and 10. The one or more synchronizing pins 86 may be disengaged from the second rocker arm 84 at lower engine speeds so that only the first and second cam lobes 74, 76 having the first cam profile may engage the engine valves 90. The first and second cam lobes 74, 76 may be constructed and arranged to cause the engine valves 90 to open with a low valve lift 92, variations of which are illustrated in FIGS. 8 and 9. The one or more synchronizing pins 86 may then engage and lock the second rocker arm 84 to the first rocker arm 82 at higher engine speeds. This may cause the third cam 78 to control the engine valves 90 at higher engine speeds. The third cam 78 may be constructed and arranged to cause the engine valves 90 to open with a high valve lift 94, variations of which are illustrated in FIGS. 10 and 11. The use of the stepped cam 72 may improve engine performance.

In a number of variations, one or more latching solenoids 20 may be operatively connected to the one or more synchronizing pins 86 to control which cam profile may be used, variations of which are illustrated in FIGS. 8 and 10.

In a number of variations, the latching solenoid 20 may be energized at higher engine operating speeds. This may cause the latching solenoid 20 to open which may allow hydraulic pressure to cause the one or more synchronizing pins 86 to engage and lock the first rocker arm 82 to the second rocker arm 84. This may allow the second cam profile to control the engine valves 90 and may cause the engine valves 90 to open with a high lift 94 at a higher engine speed. The at least one latching solenoid 20 may then be de-energized, however, due to the residual magnetism of the latching solenoid 20, the valve 24 may remain open so that the one or more synchronizing pins 86 may remain locked between the first and second rocker arms 82, 84 so that the second cam profile may continue to control the engine valves 90 without the need for a constant current supply.

In a number of variations, the valve 24 may be closed by eliminating the residual magnetism of the at least one latching solenoid 20. This may cause the valve 24 to be closed which may prevent hydraulic pressure from contacting the one or more synchronizing pins 86 which may allow the one or more synchronizing pins 86 to remain disengaged so that the first rocker arm 82 is not locked to the second rocker arm 84. This may allow the first cam profile to control the engine valves 90 and may cause the engine valves 90 to open with a low lift 92 at lower engine speeds.

The use of the one or more latching solenoids 20 for a stepped cam 20 may improve energy efficiency where numerous solenoids are required as the latching solenoids 20 may only require inrush current during the time the latching solenoid 20 changes states rather than requiring a continuous current to hold the solenoid in the various states.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a latching solenoid comprising: a valve; a spring operatively connected to the valve; a base plate adjacent the valve, wherein the base plate is constructed and arranged to maintain residual magnetism; an armature adjacent the base plate and operatively connected to the spring; a pin disposed within the armature and operatively connected to the valve; wherein the latching solenoid includes a coil, wherein when the latching solenoid is energized the coil pulls the armature in a first direction toward the base plate; and wherein when the latching solenoid is energized the base plate becomes residually magnetized so that when the armature moves in the first direction toward the base plate the armature magnetically latches to the base plate and remains attached to the base plate when the latching solenoid is de-energized.

Variation 2 may include a product as set forth in Variation 1 wherein the armature is unlatched from the base plate by eliminating or reversing the residual magnetism.

Variation 3 may include a product as set forth in any of Variations 1-2 wherein an intervening element separates the armature from the base plate when the residual magnetism is eliminated.

Variation 4 may include a product as set forth in Variation 3 wherein the intervening element is the spring.

Variation 5 may include a product as set forth in any of Variations 1-4 wherein the base plate comprises a hard magnetic material.

Variation 6 may include a product as set forth in any of Variations 1-5 wherein at least one latching solenoid is operatively connected to at least one cylinder in an engine to control cylinder deactivation.

Variation 7 may include a product as set forth in Variation 6 wherein the at least one latching solenoid is operatively attached to at least one lifter mechanism operatively associated with the at least one cylinder; wherein when the at least one latching solenoid is energized, the valve opens which allows oil to enter into the at least one lifter mechanism to activate the at least one cylinder; wherein when the at least one latching solenoid is de-energized, the valve remains open through residual magnetism and continues to allow oil to enter into the at least one lifter mechanism to activate the at least one cylinder; and wherein when the residual magnetism is eliminated the valve closes to prevent oil from entering into the at least one lifter mechanism to deactivate the at least one cylinder.

Variation 8 may include a product as set forth in any of Variations 1-5 wherein at least one latching solenoid is operatively connected to at least one cylinder in an engine to control a stepped cam.

Variation 9 may include a product as set forth in Variation 8 wherein when the at least one latching solenoid is activated, it causes the valve to open to cause a second cam profile to control at least one engine valve; wherein when the at least one latching solenoid is deactivated, the valve remains open through residual magnetism and continues to hold the valve open to allow the second cam profile to control the at least one engine valve; and wherein when the residual magnetism is eliminated the valve closes to allow the first cam profile to control the at least one engine valve.

Variation 10 may include a product as set forth in Variation 9 wherein the first cam profile causes the at least one engine valve to open with a low valve lift and wherein the second cam profile causes the at least one engine valve to open with a high valve lift.

Variation 11 may include a product as set forth in any of Variations 9-10 wherein the at least one latching solenoid activates the first cam profile when the engine is operating at a low engine speed and wherein the at least one latching solenoid activates the second cam profile when the engine is operating at a high engine speed.

Variation 12 may include a method comprising: engine management during cylinder deactivation using latching solenoids comprising: operatively connecting at least one latching solenoid to at least one cylinder in an engine; energizing the at least one latching solenoid to activate the at least one cylinder; de-energizing the at least one latching solenoid and using residual magnetism to keep the at least one cylinder activated; and eliminating the residual magnetism to deactivate the at least one cylinder.

Variation 13 may include a method as set forth in Variation 12 wherein the at least one latching solenoid is operatively attached to at least one lifter mechanism operatively associated with the at least one cylinder; wherein when the at least one latching solenoid is energized, the valve opens allowing oil to flow into the at least one lifter mechanism activating the cylinder; wherein when the at least one latching solenoid is de-energized, residual magnetism allows the valve to remain open to continue allowing oil to flow into the at least one lifter mechanism; and wherein when the residual magnetism is eliminated, the valve closes preventing oil from entering into the at least one lifter mechanism deactivating the at least one cylinder.

Variation 14 may include a method as set forth in any of Variations 12-13 wherein the at least one latching solenoid comprises residual magnetism so that the at least one latching solenoid retains a first position without a continuing current.

Variation 15 may include a method as set forth in Variation 14 wherein the at least one latching solenoid is released from the first position when the residual magnetism is eliminated by sending a reverse current to the at least one latching solenoid.

Variation 16 may include a method comprising: managing a stepped cam using latching solenoids comprising: operatively connecting at least one latching solenoid to at least one cylinder in an engine; energizing the at least one latching solenoid to activate a second cam profile; de-energizing the at least one latching solenoid and using residual magnetism to keep the second cam profile activated; and eliminating the residual magnetism to activate a first cam profile.

Variation 17 may include a method as set forth in Variation 16 wherein the first cam profile causes at least one engine valve to open with a low valve lift and wherein the second cam profile causes the at least one engine valve to open with a high valve lift.

Variation 18 may include a method as set forth in any of Variations 16-17 wherein the at least one latching solenoid activates the first cam profile when the engine is operating at a low engine speed and wherein the at least one latching solenoid activates the second cam profile when the engine is operating at a high engine speed.

Variation 19 may include a method as set forth in any of Variations 16-18 wherein the at least one latching solenoid comprises residual magnetism so that the at least one latching solenoid retains a first position without a continuing current.

Variation 20 may include a method as set forth in any of Variations 16-18 wherein the at least one latching solenoid is released from the first position when the residual magnetism is eliminated by sending a reverse current to the at least one latching solenoid.

The above description of select variations within the scope of the invention is merely illustrative in nature and, thus, variations or variants thereof are not to be regarded as a departure from the spirit and scope of the invention.

What is claimed is:

1. A product comprising:
   a latching solenoid comprising:
   a valve;
   a spring operatively connected to the valve;
   a base plate adjacent the valve, wherein the base plate is constructed and arranged to maintain residual magnetism;
   an armature adjacent the base plate and operatively connected to the spring;
   a pin disposed within the armature and operatively connected to the valve;
   wherein the latching solenoid includes a coil, wherein when the latching solenoid is energized the coil pulls the armature in a first direction toward the base plate; and
   wherein when the latching solenoid is energized the base plate becomes residually magnetized so that when the armature moves in the first direction toward the base plate the armature magnetically latches to the base plate and remains attached to the base plate by residual magnetism in the base plate alone, against a push of the spring, when the latching solenoid is de-energized;
   wherein the latching solenoid is operatively connected to at least one cylinder in an engine to control cylinder deactivation.

2. A product as set forth in claim 1 wherein the armature is unlatched from the base plate by eliminating or reversing the residual magnetism.

3. A product as set forth in claim 2 wherein an intervening element separates the armature from the base plate when the residual magnetism is eliminated.

4. A product as set forth in claim 3 wherein the intervening element is the spring.

5. A product as set forth in claim 1 wherein the base plate comprises a hard magnetic material.

6. A product as set forth in claim 1 wherein the at least one latching solenoid is operatively attached to at least one lifter mechanism operatively associated with the at least one cylinder;
   wherein when the at least one latching solenoid is energized, the valve opens which allows oil to enter into the at least one lifter mechanism to activate the at least one cylinder;
   wherein when the at least one latching solenoid is de-energized, the valve remains open through residual magnetism and continues to allow oil to enter into the at least one lifter mechanism to activate the at least one cylinder; and
   wherein when the residual magnetism is eliminated the valve closes to prevent oil from entering into the at least one lifter mechanism to deactivate the at least one cylinder.

7. A product as set forth in claim 1 wherein the latching solenoid is operatively connected to at least one cylinder in an engine to control a stepped cam.

8. A product as set forth in claim 7 wherein when the at least one latching solenoid is activated, it causes the valve to open to cause a second cam profile to control at least one engine valve;
   wherein when the at least one latching solenoid is deactivated, the valve remains open through residual magnetism and continues to hold the valve open to allow the second cam profile to control the at least one engine valve; and
   wherein when the residual magnetism is eliminated the valve closes to allow the first cam profile to control the at least one engine valve.

9. A product as set forth in claim 8 wherein the first cam profile causes the at least one engine valve to open with a low valve lift and wherein the second cam profile causes the at least one engine valve to open with a high valve lift.

10. A product as set forth in claim 9 wherein the at least one latching solenoid activates the first cam profile when the engine is operating at a low engine speed and wherein the at least one latching solenoid activates the second cam profile when the engine is operating at a high engine speed.

11. A method comprising:
    engine management during cylinder deactivation using latching solenoids comprising:
    operatively connecting at least one latching solenoid to at least one cylinder in an engine;

energizing the at least one latching solenoid to activate the at least one cylinder;

de-energizing the at least one latching solenoid and using residual magnetism in a base plate of the at least one latching solenoid alone to keep the at least one cylinder activated; and eliminating the residual magnetism to deactivate the at least one cylinder.

12. The method of claim 11 wherein the at least one latching solenoid is operatively attached to at least one lifter mechanism operatively associated with the at least one cylinder;

wherein when the at least one latching solenoid is energized, the valve opens allowing oil to flow into the at least one lifter mechanism activating the cylinder;

wherein when the at least one latching solenoid is de-energized, residual magnetism allows the valve to remain open to continue allowing oil to flow into the at least one lifter mechanism; and wherein when the residual magnetism is eliminated, the valve closes preventing oil from entering into the at least one lifter mechanism deactivating the at least one cylinder.

13. The method of claim 11 wherein the at least one latching solenoid comprises residual magnetism so that the at least one latching solenoid retains a first position without a continuing current.

14. The method of claim 13 wherein the at least one latching solenoid is released from the first position when the residual magnetism is eliminated by sending a reverse current to the at least one latching solenoid.

15. A method comprising:

managing a stepped cam using latching solenoids comprising:

operatively connecting at least one latching solenoid to at least one cylinder in an engine;

energizing the at least one latching solenoid to activate a second cam profile;

de-energizing the at least one latching solenoid and using residual magnetism in a base plate of the at least one latching solenoid alone to keep the second cam profile activated; and eliminating the residual magnetism to activate a first cam profile.

16. A method as set forth in claim 15 wherein the first cam profile causes at least one engine valve to open with a low valve lift and wherein the second cam profile causes the at least one engine valve to open with a high valve lift.

17. A method as set forth in claim 16 wherein the at least one latching solenoid activates the first cam profile when the engine is operating at a low engine speed and wherein the at least one latching solenoid activates the second cam profile when the engine is operating at a high engine speed.

18. The method of claim 15 wherein the at least one latching solenoid comprises residual magnetism so that the at least one latching solenoid retains a first position without a continuing current.

19. The method of claim 18 wherein the at least one latching solenoid is released from the first position when the residual magnetism is eliminated by sending a reverse current to the at least one latching solenoid.

* * * * *